US009016450B2

(12) United States Patent
Menne et al.

(10) Patent No.: US 9,016,450 B2
(45) Date of Patent: Apr. 28, 2015

(54) METHOD FOR CONTROLLING A HYDRODYNAMIC RETARDER WHICH CAN BE DISENGAGED MECHANICALLY VIA A SEPARATING CLUTCH

(71) Applicant: Voith Patent GmbH, Heidenheim (DE)

(72) Inventors: Achim Menne, Crailsheim (DE); Tilman Huth, Satteldorf (DE); Dieter Laukemann, Crailsheim (DE); Werner Koch, Deggingen (DE); Werner Klement, Heidenheim (DE); Martin Becke, Ulm (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 13/883,983

(22) PCT Filed: Nov. 28, 2012

(86) PCT No.: PCT/EP2012/073827
§ 371 (c)(1),
(2) Date: May 7, 2013

(87) PCT Pub. No.: WO2013/083457
PCT Pub. Date: Jun. 13, 2013

(65) Prior Publication Data
US 2014/0151176 A1   Jun. 5, 2014

(30) Foreign Application Priority Data

Dec. 9, 2011 (DE) .......................... 10 2011 120 621

(51) Int. Cl.
*F16D 57/04* (2006.01)
*B60T 10/02* (2006.01)
*F16H 41/24* (2006.01)
*F16D 67/02* (2006.01)

(52) U.S. Cl.
CPC ................ *F16H 41/24* (2013.01); *B60T 10/02* (2013.01); *F16D 57/04* (2013.01); *F16D 67/02* (2013.01)

(58) Field of Classification Search
USPC ....................... 192/12 A, 216; 188/291, 266.3
See application file for complete search history.

(56) References Cited

U.S. PATENT DOCUMENTS

| | | | | |
|---|---|---|---|---|
| 2,055,297 | A | * | 9/1936 | Lane .............................. 188/291 |
| 3,777,860 | A | * | 12/1973 | Forster et al. ................. 188/291 |
| 4,324,320 | A | * | 4/1982 | Spurlin et al. ................ 188/271 |
| 5,101,941 | A | * | 4/1992 | Long et al. .................... 188/290 |

FOREIGN PATENT DOCUMENTS

| | | |
|---|---|---|
| DE | 10 2005 052 121 | 5/2007 |
| DE | 10 2007 024 698 | 11/2008 |

OTHER PUBLICATIONS

English Translation of PCT International Preliminary Report on Patentability dated Jun. 10, 2014 in PCT Application No. PCT/EP2012/073827.

* cited by examiner

*Primary Examiner* — Rodney H Bonck
(74) *Attorney, Agent, or Firm* — Farjami & Farjami LLP

(57) ABSTRACT

There is provided a method for controlling a hydrodynamic retarder. The method includes determining a presence of a retarder switch-off request, and keeping a separating clutch closed, after the determining, for a preset time span and emptying a working chamber of the hydrodynamic retarder of a working medium by continuous actuation of a rotating bladed rotor and interruption of infeed of the working medium into the working chamber. The method further included varying the preset time span according to at least one of the following parameters or at least one parameter correlated with one of the following parameters: a rotational speed of the rotating bladed rotor, an output pressure, against which the working medium is emptied from the working chamber, a filling level of the working chamber with the working medium, a temperature of the working medium, and a braking torque of the hydrodynamic retarder.

20 Claims, 1 Drawing Sheet

METHOD FOR CONTROLLING A HYDRODYNAMIC RETARDER WHICH CAN BE DISENGAGED MECHANICALLY VIA A SEPARATING CLUTCH

This is a U.S. national phase application, which is based on, and claims priority from, PCT application Serial No. PCT/EP2012/073827, filed Nov. 28, 2012, which claims priority from foreign application Serial No. 10 2011 120 621.7, filed Dec. 9, 2011, in Germany.

The present invention concerns a method for controlling a hydrodynamic retarder which can be disengaged mechanically via a separating clutch in a motor vehicle, having the features summarized in the preamble of the claim 1.

To bring down the no-load losses of a hydrodynamic retarder to zero, it has already been suggested to disengage in a non-braking operation the hydrodynamic retarder from the drive train, which it should brake down in braking operation, by means of a separating clutch. Simultaneously, the working chamber is emptied from working medium when passing from braking operation to non-braking operation, which working medium transmits a hydrodynamic circular flow in braking operation in the working chamber for transmitting the torque from the rotor to the stator or in the case of a counter-rotating retarder from the rotor to a counter-rotor rotating in the opposite direction and thereby brakes down the rotor and therewith the driving drive train.

The switching on and off of a hydrodynamic retarder is normally controlled by an electronic control device, whereby the electronic control device receives requirements as regards the switching-on, the switching-off or the adjustment of a certain braking torque to be more accurate or a certain braking step either from a vehicle driver, which actuates a corresponding input device, for instance a pitman arm, or in certain embodiments also from a so-called driver assistance system, for instance a speed regulating system or a distance maintenance system of the vehicle. Everytime for instance the electronic control device detects a retarder switch-off request it triggers the emptying of the working chamber from working medium and the opening of the separating clutch.

As regards traffic safety and comfort, it is important that requests as regards the switching-on, switching-off or adjustment of a set braking torque of the hydrodynamic retarder are applied as quickly as possible. The aim is to apply a corresponding request in less than a second or even less than 0.5 second.

It is hence understandable that when for instance a retarder switch-off request is detected, the emptying of the working chamber and the opening of the separating clutch is carried out so far immediately and accelerated.

In practice it has appeared that the desired reaction times can normally be respected. Indeed, in particular in case of frequent switching on and off processes of hydrodynamic retarders, which are disengaged mechanically from the drive train when passing from braking operation to non-braking operation and are again switched on when passing from non-braking operation to braking operation by friction slip bridging in the separating clutch, the wear in the clutch is relatively high and hence the maintenance involved is significant.

The object of the present invention is to provide a method for controlling a retarder of the type mentioned initially, for which the maintenance involved can be reduced.

The object of the invention is solved by a process exhibiting the features of claim 1. Advantageous and particularly appropriate embodiments of the invention are disclosed in the dependent claims.

The inventors have recognised that the wear of the separating clutch can be reduced substantially, when it is ensured that starting the hydrodynamic retarder to be more accurate synchronisation of the separating clutch when passing from non-braking operation to braking operation only takes place when the working chamber of the hydrodynamic retarder is completely or extensively empty of working medium. Now to guarantee this result, the method according to the invention resorts to the switching-off process of the hydrodynamic retarder, that is to say it passes from braking operation to non-braking operation. It should already be guaranteed here that the working chamber of the retarder is emptied completely or practically completely. This was not always ensured with known embodiments since the emptying is triggered partially or exclusively by means of the pumping effect of the retarder to be more accurate of the rotor of the retarder and hence the necessary time span, via which the rotor rotates after the switch-off command, that is to say after the retarder switch-off request, until the emptying process is completed, varies depending on the constraints. For instance, the emptying of the working chamber lasts as the rotational speed of the rotor decreases or is longer as the filling level of the working chamber increases.

According to the method of the invention, when passing from braking operation to non-braking operation, wherein said transition is initiated via a retarder switch-off request of a driver assistance system or via actuation of an input device by the vehicle driver, after determining the presence of a retarder switch-off request, the separating clutch is kept closed for a preset time span and the working chamber of the retarder is emptied of the working medium by continuous actuation of the rotor and interruption of infeed of working medium into the working chamber, normally by partial or exclusive use of the pumping effect of the rotor, wherein the preset time span is varied according to at least one of the following parameters or at least one parameter correlated with one of the parameters, when and/or after determining the retarder switch-off request:

the rotational speed of the rotor of the hydrodynamic retarder;
an output pressure, against which the working medium is emptied from the working chamber;
the filling level of the working chamber with working medium;
the temperature of the working medium;
the braking torque of the hydrodynamic retarder.

By separating clutch should be understood in this instance every component which in a first operating mode creates a power transmission, in particular a mechanical power transmission and in a second operating mode interrupts said transmission, consequently for instance synchronous elements, friction clutches and others.

It is also basically possible to disengage the hydrodynamic retarder mechanically in such a way that the rotor is further driven but the stator is released via a separating clutch from a support on a stationary component, so that it rotates freely with the rotor.

Any control device can be considered as a driver assistance system, which generates a retarder braking torque request, in particular however a speed regulating system or distance maintenance system. The preset time span is increased in particular as the rotational speed of the rotor decreases, to be more accurate with the reduction of the parameter correlated therewith. If the outlet pressure is used as a constraint for the variation of the time span, so the preset time span grows larger in particular as the outlet pressure increases or as the size increases, which correlates with the outlet pressure.

If the filling level is used as a constraint, the time span grows larger in particular as the filling level increases to be more accurate as the size correlated with the filling level increases.

If the temperature of the working medium is used as a constraint, the preset time span is reduced in particular as the temperature increases, to take into account the viscosity of the working medium during emptying, to be more accurate as the size increases, a size which correlates with the temperature.

It is also possible when taking into account the braking torque of the hydrodynamic retarder as a constraint, to increase the preset time as the braking torque increases, to be more accurate as the size increases, a size which correlates with the braking torque.

A parameter which correlates with the braking torque is generally the so-called filling level of the working chamber with working medium. Another parameter is for instance the so-called housing pressure of the hydrodynamic retarder, that is to say any static pressure outside the working chamber in the housing enclosing the working chamber. An additional correlating parameter is for instance the so-called loading pressure of the hydrodynamic retarder, that is to say the pressure, with which the hydrodynamic retarder normally is controlled via a retarder control device to adjust the desired braking torque. The loading pressure enables for instance to cause a displacing effect on a storage tank for working medium of the hydrodynamic retarder so that the filling level and hence the braking torque are increased or reduced by displacing more or less strongly the working medium from the storage tank into the working chamber of the retarder. Alternately, the loading pressure can be applied to a retarder control valve which accumulates the working fluid flow in the flow direction of the working medium behind the working chamber, generally by an outlet of the hydrodynamic retarder and thereby more or less raises the working medium pressure in the working chamber of the hydrodynamic retarder and the filling level of the working chamber.

The invention can be integrated into a retarder in its control device. The invention will now be described by way of example using an embodiment and the figures.

Figure 1:
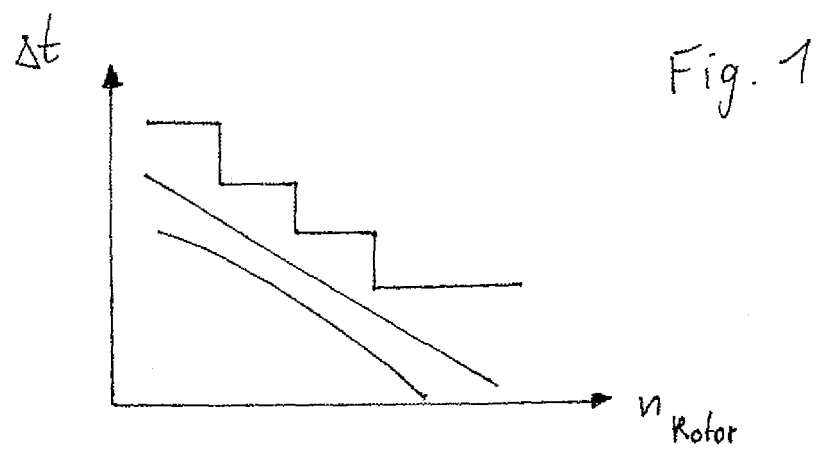
FIG. 1 shows an exemplary illustration of the allocation of different time spans to different rotor rotational speeds.

FIG. 1 represents as an exemplary embodiment how different preset time spans can be allocated to different rotational speeds of the rotor, for instance by means of a stepwise allocation, a linear allocation or a constantly non-linear allocation. The preset time spans are these time spans during which a separating clutch for driving the rotor of the hydrodynamic retarder is still kept closed, once a retarder switch-off request has been detected. During this preset time span, the retarder respectively its working chamber can empty itself by the pumping effect of the rotor of the working medium.

Figure 2:
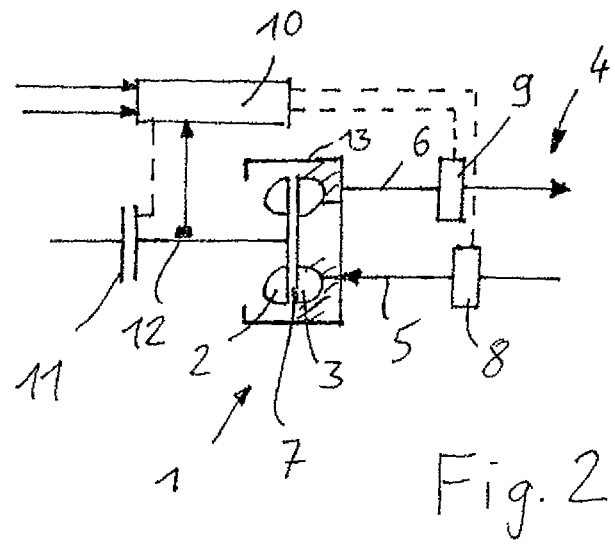
FIG. 2 shows a diagrammatical illustration of a hydrodynamic retarder controlled according to the invention.

FIG. 2 represents such a hydrodynamic retarder 1 with a rotor 2 and a stator 3. The working medium is conveyed from an external working medium circuit 4 to the working chamber 7 via a working medium supply 5 and discharged from the retarder 1 for cooling the working medium heated in the working chamber 7 via a working medium outlet 6. An inlet valve 8 is arranged in the working medium supply 5 and a retarder outlet valve 9 is provided in the working medium exhaust 6. The retarder control device 10 resorts to the retarder inlet valve 8 as well as to the retarder outlet valve 9. The retarder inlet valve 8 opens for the transition from non-braking operation to braking operation. The retarder exhaust valve 9 is operated with a loading pressure in such a way that it triggers the desired accumulation of the working medium and hence the requested filling level of the working chamber 7. Alternately, a filling level control could be considered by means of a displacing pressurization of a stock of working medium.

When passing from braking operation to non-braking operation, the inlet valve 8 closes so that no additional working medium can flow into the working chamber 7. At the same time, the outlet valve 9 is held open until the working chamber 7 has emptied itself down to the requested level. It is necessary for that purpose to drive the rotor 2 continuously to use its pumping effect. The separating clutch 11 is consequently held closed until it is ensured that the emptying has taken place as sufficient.

Since the duration of the emptying depends on the rotational speed of the rotor 2 at the moment of the requested switch-off, that is to say when receiving the retarder switch-off request, the rotational speed of the rotor 2 is detected, for instance via the represented rotational speed sensor 12 and communicated to the retarder control device 10. The rotational speed sensor 12 could also be positioned at another location, for instance in direction of the drive power flow upstream of the separating clutch 11 or the rotational speed could be made available otherwise to the retarder control device 10, for instance via a CAN-bus, since the rotational speed normally depends on another rotational speed in the drive train in which the hydrodynamic retarder 1 is provided, for instance the transmission power take-off rotational speed of a motor vehicle transmission or the vehicle speed, in the case of a so-called secondary retarder or the engine rotational speed in the case of a primary retarder. The retarder control device 10 further controls, as indicated by the dashed line, the opening and closing of the separating clutch 11. Besides, it receives input signals, for instance from a retarder control lever and a driver assistance system, to be able to determine a retarder switch-off request.

As explained previously, other constraints can be considered additionally or alternately to the rotor rotational speed for setting the time span, via which the separating clutch still remains closed after establishing the retarder switch-off request. It should be repeated at that stage again by way of example that for that purpose the pressure can be considered in the retarder outlet 6 or the so-called housing pressure in the housing 13 of the hydrodynamic retarder outside the working chamber 7.

The invention claimed is:

1. A method for controlling a hydrodynamic retarder which can be disengaged mechanically via a separating clutch in a motor vehicle, the hydrodynamic retarder including a rotating bladed rotor and a bladed stator or a rotating bladed rotor and a bladed counter-rotor rotating in an opposite direction thereto, which together form a working chamber filled with a working medium in a braking operation and emptied of the working medium in a non-braking operation, wherein the rotating bladed rotor is driven in the braking operation via a drive train with a closed separating clutch and the working chamber is emptied when passing from the braking operation to the non-braking operation and the separating clutch opens, wherein a transition from the braking operation to the non-braking operation is initiated via a retarder switch-off request of a driver assistance system or via an actuation of an input device by a vehicle driver, the method comprising:

determining a presence of the retarder switch-off request;

keeping the separating clutch closed, after the determining, for a preset time span and emptying the working chamber of the hydrodynamic retarder of the working medium by continuous actuation of the rotating bladed rotor and interruption of infeed of the working medium into the working chamber;

varying the preset time span according to at least one of the following parameters or at least one parameter correlated with one of the following parameters:
a rotational speed of the rotating bladed rotor;
an output pressure, against which the working medium is emptied from the working chamber;
a filling level of the working chamber with the working medium;
a temperature of the working medium; and
a braking torque of the hydrodynamic retarder.

2. The method according to claim 1 further comprises increasing the preset time span as the rotational speed decreases.

3. The method according to claim 2 further comprises increasing the preset time span as the outlet pressure increases.

4. The method according to claim 2 further comprises increasing the preset time span as the filling level increases.

5. The method according to claim 1 further comprises increasing the preset time span as the outlet pressure increases.

6. The method according to claim 5 further comprises increasing the preset time span as the filling level increases.

7. The method according to claim 1 further comprises increasing the preset time span as the filling level increases.

8. The method according to claim 1 further comprises decreasing the preset time span as the temperature increases.

9. The method according to claim 1 further comprises increasing at the preset time span as the braking torque increases.

10. A hydrodynamic retarder comprising:
a rotating bladed rotor and a bladed stator or a rotating bladed rotor and a bladed counter-rotor rotating in an opposite direction thereto, which together form a working chamber which can be filled with a working medium in a braking operation and which can be emptied of the working medium in a non-braking operation:
a drive train, by which the rotating bladed rotor is driven and in which a separating clutch is provided, wherein a retarder control device is associated with the hydrodynamic retarder, wherein the retarder control device is arranged to:
determine a presence of a retarder switch-off request;
keep the separating clutch closed, after the determining, for a preset time span and empty the working chamber of the hydrodynamic retarder of the working medium by continuous actuation of the rotating bladed rotor and interruption of infeed of the working medium into the working chamber;
vary the preset time span according to at least one of the following parameters or at least one parameter correlated with one of the following parameters:
a rotational speed of the rotating bladed rotor;
an output pressure, against which the working medium is emptied from the working chamber;
a filling level of the working chamber with the working medium;
a temperature of the working medium; and
a braking torque of the hydrodynamic retarder.

11. A method for controlling a hydrodynamic retarder which can be disengaged mechanically via a separating clutch in a motor vehicle the hydrodynamic retarder including a rotating bladed rotor and a bladed stator or a rotating bladed rotor and a bladed counter-rotor rotating in an opposite direction thereto, which together form a working chamber filled with a working medium in a braking operation and emptied of the working medium in a non-braking operation, wherein the bladed counter-rotor is driven in the braking operation via a drive train with a closed separating clutch or the bladed stator is supported stationary against a fixed component in the braking operation with a closed separating clutch and the working chamber is emptied when passing from the braking operation to the non-braking operation and the separating clutch opens, wherein a transition from the braking operation to the non-braking operation is initiated via a retarder switch-off request of a driver assistance system or via an actuation of an input device by a vehicle driver, the method comprising:
determining a presence of the retarder switch-off request;
keeping the separating clutch closed, after the determining, for a preset time span and emptying the working chamber of the hydrodynamic retarder of the working medium by continuous actuation of the rotating bladed rotor and interruption of infeed of the working medium into the working chamber;
varying the preset time span according to at least one of the following parameters or at least one parameter correlated with one of the following parameters:
a rotational speed of the rotating bladed rotor;
an output pressure, against which the working medium is emptied from the working chamber;
a filling level of the working chamber with the working medium;
a temperature of the working medium; and
a braking torque of the hydrodynamic retarder.

12. The method according to claim 11 further comprising increasing the preset time span as the rotational speed decreases.

13. The method according to claim 12 further comprising increasing the preset time span as the outlet pressure increases.

14. The method according to claim 12 further comprising increasing the preset time span as the filling level increases.

15. The method according to claim 11 further comprising increasing the preset time span as the outlet pressure increases.

16. The method according to claim 15 further comprising increasing the preset time span as the filling level increases.

17. The method according to claim 11 further comprising increasing the preset time span as the filling level increases.

18. The method according to claim 11 further comprising decreasing the preset time span as the temperature increases.

19. The method according to claim 11 at further comprising increasing the preset time span as the braking torque increases.

20. A hydrodynamic retarder comprising:
a rotating bladed rotor and a bladed stator or a rotating bladed rotor and a counter-rotor rotating in an opposite direction thereto, which together form a working chamber which can be filled with a working medium in a braking operation and which can be emptied of the working medium in a non-braking operation;
a drive train, by which the rotating bladed rotor is driven and in which a separating clutch is provided, wherein a retarder control device is associated with the hydrodynamic retarder, wherein the retarder control device is arranged to:
determine a presence of a retarder switch-off request;
keep the separating clutch closed, after the determining, for a preset time span and empty the working chamber of the hydrodynamic retarder of the working medium by continuous actuation of the rotating bladed rotor and interruption of infeed of the working medium into the working chamber;
vary the preset time span according to at least one of the following parameters or at least one parameter correlated with one of the following parameters:
a rotational speed of the rotating bladed rotor;
an output pressure, against which the working medium is emptied from the working chamber;
a filling level of the working chamber with the working medium;
a temperature of the working medium; and
a braking torque of the hydrodynamic retarder.

\* \* \* \* \*